United States Patent [19]

Byszewski et al.

[11] Patent Number: 5,723,951
[45] Date of Patent: Mar. 3, 1998

[54] METHOD OF HOT RESTARTING A HIGH INTENSITY DISCHARGE LAMP

[75] Inventors: Wojciech W. Byszewski, Boston; Yan Ming Li, Cambridge; A. Bowman Budinger, Westford, all of Mass.

[73] Assignee: Osram Sylvania Inc., Danvers, Mass.

[21] Appl. No.: 670,891

[22] Filed: Jun. 26, 1996

[51] Int. Cl.[6] .................................................... H05B 41/00
[52] U.S. Cl. ........................... 315/174; 315/248; 315/344; 315/86; 313/623; 313/283
[58] Field of Search ........................................ 315/335, 338, 315/344, 248, 174, 308, 360, 86, 307, DIG. 7, 176; 313/623, 283; 372/38; 307/64, 86

[56] References Cited

U.S. PATENT DOCUMENTS

| | | | |
|---|---|---|---|
| 4,356,433 | 10/1982 | Linden | 315/308 |
| 4,763,044 | 8/1988 | Nuckolls et al. | 315/176 |
| 4,798,997 | 1/1989 | Egami et al. | 315/115 |
| 4,888,528 | 12/1989 | Byszewski et al. | 315/344 |
| 4,890,041 | 12/1989 | Nuckolls et al. | 315/225 |
| 5,287,039 | 2/1994 | Gregor et al. | 315/248 |
| 5,373,217 | 12/1994 | Gregor | 315/248 |

*Primary Examiner*—Robert Pascal
*Assistant Examiner*—Arnold Kinkead
*Attorney, Agent, or Firm*—Carlo S. Bessone

[57] ABSTRACT

An apparatus and method for operating an arc discharge lamp which can be hot restarted is described. The method involves providing low microwave power after the lamp ballast is disconnected from the lamp. The microwave power is modulated such that conductivity is maintained within the lamp as the lamp cools. Restarting the lamp is accomplished by reconnecting the ballast at any time. In one embodiment, the apparatus of the invention includes an arc discharge lamp and ballast coupled together with a switch to turn the lamp on and off. A microwave power supply is connected in parallel with the ballast and is coupled to the lamp when the ballast is shut off. The invention allows for hot restart of the arc lamp without requiring a high voltage pulse.

10 Claims, 4 Drawing Sheets

METHOD OF HOT RESTARTING A HIGH INTENSITY DISCHARGE LAMP

FIELD OF THE INVENTION

This invention relates to restarting of high intensity discharge (HID) lamps and, more particularly, to a method for shutting down HID lamps so that they may be restarted almost instantaneously.

BACKGROUND OF THE INVENTION

The pressure and consequently the density inside an arc tube of a HID lamp is a function of the operating temperature. At room temperature gas pressure is on the order of 10 to 100 torr (approximately 1/70 to 1/7 of an atmosphere). The gas is mainly an inert buffer gas such as argon or neon. During normal operation, the arc tube increases in temperature and volatilizes the condensate which is mainly mercury. At steady state arc tube operating temperature (850°–900° C.) all of the condensate is volatilized. The resulting arc tube pressure is approximately 5 atmosphere with a subsequently proportional increase in density.

Thus, during normal operation of mercury metal halide and other HID lamps a very high pressure of the condensate is reached. Hot restart of such a lamp is extremely difficult due to the high voltage required for electrical breakdown. The breakdown voltage can be determined approximately from E/N (electric field strength over gas density) which characterizes electrical breakdown in unsaturated condensate vapors. In a typical low wattage metal halide lamp the voltage required for hot lamp breakdown is in the range of 10 to 25 kV. Hot lamp restart requires, in addition to electrical breakdown, high plasma conductivity produced by this breakdown in order to re-light the lamp by a regular lamp ballast. A high voltage pulse of 20 kV of a few microseconds in duration is needed for breakdown of the hot lamp, however, this does not usually produce sufficient conductivity within the lamp so an additional, high voltage, low impedance ballast has to be used to "carry through" the breakdown stage in the lamp starting process. Both breakdown and "carry through" conditions have to be met for hot lamp to restart.

Examples of circuits that provide a high voltage pulse are included in U.S. Pat. No. 4,356,433 wherein a lamp strike circuit which develops high voltage pulses is described.

U.S. Pat. No. 4,890,041 also shows circuits which are capable of instantaneously restarting a hot deionized lamp. The circuits described in this patent provide a high reionization voltage and more "carry through" voltage allowing a lamp to be restarted when hot.

U.S. Pat. No. 4,888,528 describes a method of cold starting a high intensity discharge lamp by applying household frequency (e.g., 50 or 60 Hertz) and ultrahigh frequency electric fields to the lamp.

U.S. Pat. No. 5,287,039 describes a method for shutting off an electrodeless high intensity discharge lamp in a manner so that it can be restarted instantaneously at any time. The method involves reducing the applied microwave power in a controlled way the moment the lamp is turned off. The reduction of power is accomplished by modulating the microwave power with an ever decreasing duty factor or a decrease of analog power.

U.S. Pat. No. 5,373,217 describes a method for providing stability during dimming of an electrodeless high intensity discharge lamp driven by a microwave source. The method involves rapidly dimming the lamp to a low level in a stable manner while preventing the possibility of lamp extinction. Remote optical sensing of lamp light output is coupled with power control circuitry which modifies microwave power delivered to the lamp based on the light response to well defined pulses of power in the output of the microwave source. Power delivered to the lamp is increased when the rate of light drop exceeds a predetermined rate and also, is controlled based on the overall light emission intensity.

SUMMARY OF THE INVENTION

It is, therefore, an object of the present invention to obviate the disadvantages of the prior art.

It is still another object of the invention to provide a method for restarting a hot lamp which eliminates the high voltage requirements and the need for an additional high voltage ballast. In one aspect of the present invention there is disclosed a method of operating a high intensity discharge lamp comprising the steps of providing a high intensity discharge lamp, applying a primary source of power to said lamp to initiate and sustain an arc discharge within the lamp, interrupting the primary source of power to the lamp to allow the lamp to cool, applying a secondary source of power to the lamp to maintain plasma conductivity within the lamp during a period of lamp cooling, and reapplying the primary source of power to the lamp after the period of lamp cooling to reignite and sustain an arc discharge within the lamp.

In one aspect of the present invention there is disclosed an apparatus for operating a high intensity discharge lamp comprising a primary source of power coupled to the lamp for initiating and sustaining an arc discharge within the lamp, means for interrupting the primary source of power to the lamp to allow the lamp to cool, means for applying a secondary source of power to the lamp to maintain plasma conductivity within the lamp during a period of lamp cooling, and means for reapplying the primary source of power to the lamp after the period of lamp cooling to reignite and sustain an arc discharge within the lamp.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawings, wherein.

For a better understanding of the present invention together with other objects, advantages and capabilities thereof, reference is made to the following description and appended claims in connection with the above described drawing.

BEST MODE FOR CARRYING OUT THE INVENTION

The present invention describes a method and device which allows for restart of a hot HID lamp without high voltage and without an additional high voltage ballast. The method is based on maintaining plasma conductivity during lamp cooling after the lamp is turned off. The plasma conductivity is prolonged by maintaining a low power microwave or RF discharge after the ballast is disconnected. Restart is accomplished by reconnecting the ballast at any time after lamp turnoff.

Figure 1:
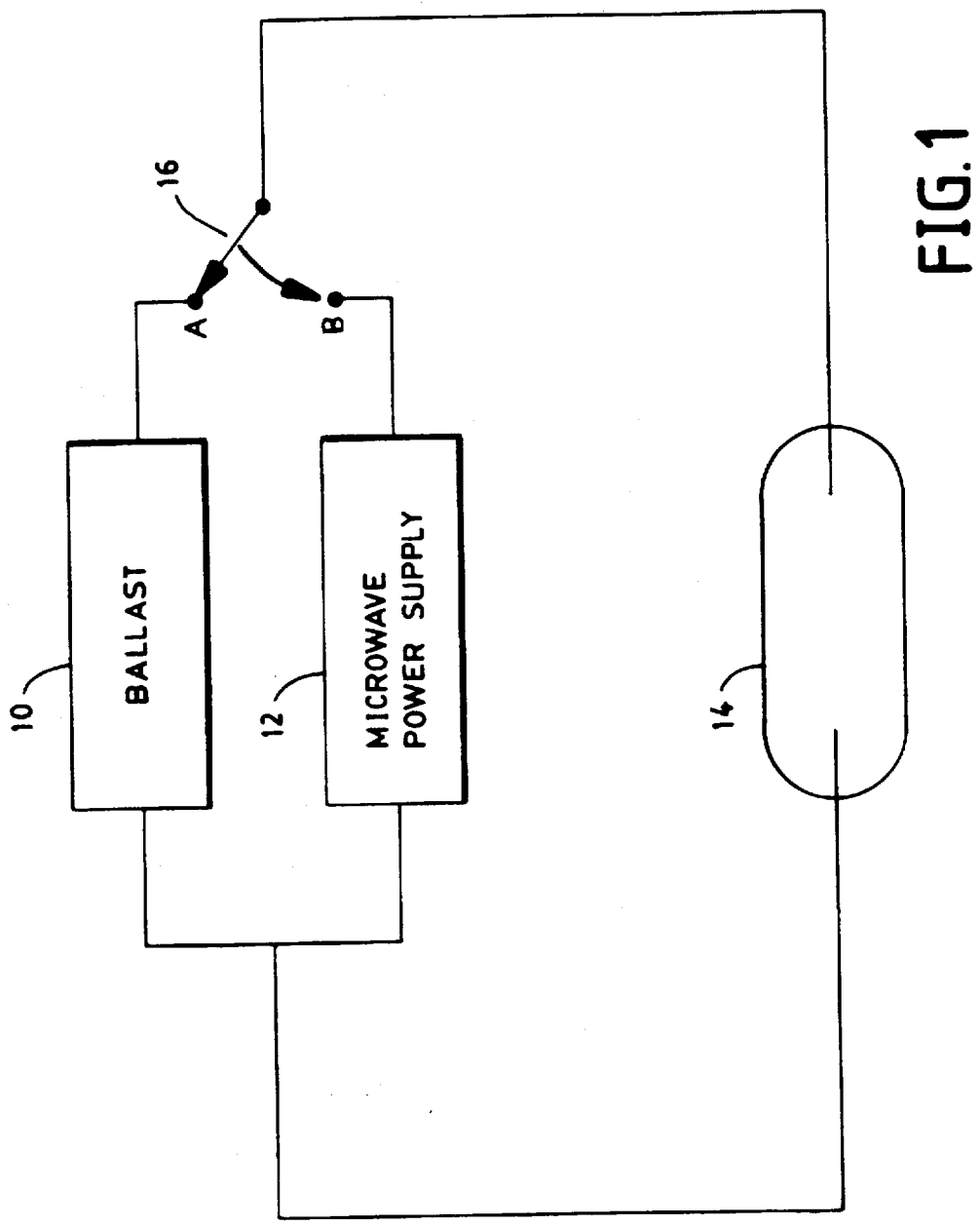
FIG. 1 represents a block diagram of a high intensity discharge circuit containing an auxiliary microwave power supply in accordance with the teachings of the present invention.

FIG. 1 illustrates a block diagram of one embodiment of a high intensity discharge lamp circuit in accordance with the present invention. The circuit contains a conventional HID ballast 10 and an auxiliary microwave power supply 12 coupled to a high intensity discharge lamp 14. A single-pole double-throw switch 16 having terminals A and B allows connection of ballast 10 or microwave power supply 12 to lamp 14. For normal lamp operation, power from ballast 10 is delivered to lamp 14 when switch 16 contacts terminal A. Following a period of normal lamp operation, ballast power is disconnected by connecting switch 16 to terminal B allowing microwave power to be supplied to the lamp as the lamp cools. The amount of microwave power supplied to the lamp is sufficient to maintain plasma conductivity and may be varied to match the lamp conditions during lamp cooling.

The amount of microwave power necessary to maintain plasma conductivity is significantly less than the operating power input to the lamp itself. This microwave power level is about 10% to 15% of full lamp arc power level. As the lamp cools, ionization losses decrease and, if emergency power saving was critical, the microwave power could be continuously reduced until the lamp reaches ambient temperature.

Figure 2:
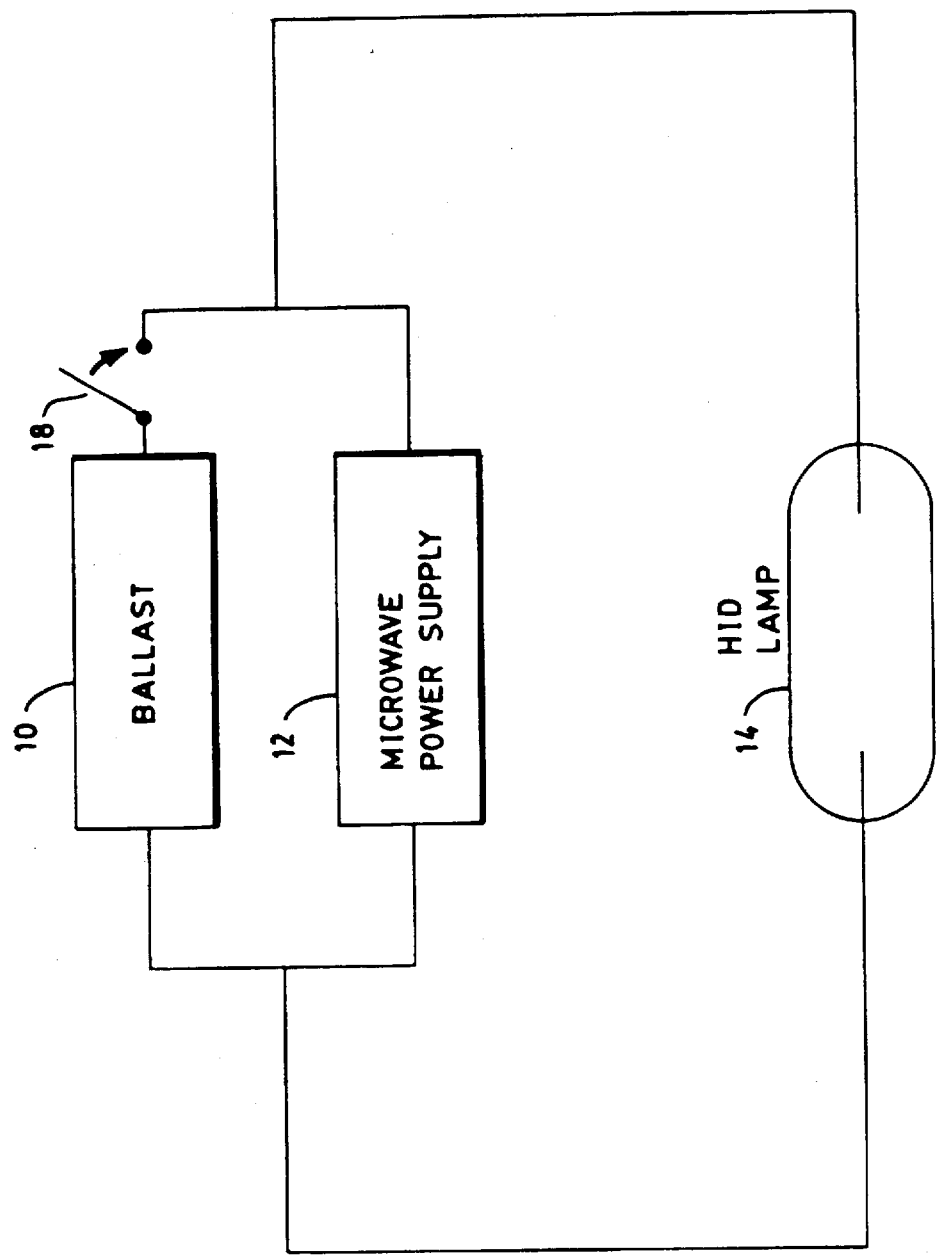
FIG. 2 is an alternative block diagram of a high intensity discharge circuit containing an auxiliary microwave power supply.

FIG. 2 illustrates a block diagram of another embodiment of a high intensity discharge lamp circuit in accordance with the present invention. In FIG. 2, a single-pole single-throw switch 18 allows connection of a HID ballast 10 to a high intensity discharge lamp 14. A microwave power supply 12 is connected directly across lamp 14. During normal operation, switch 18 is closed and power from both ballast 10 and microwave power supply 12 is supplied to lamp 14. Following a period of normal lamp operation, switch 18 is opened and lamp 14 is allowed to cool. During lamp cooling, the plasma through lamp 14 is maintained by power supplied by microwave power supply 12. As in FIG. 1, the magnitude of power supplied to lamp 14 from microwave power supply 12 could be decreased as the lamp cools.

The frequency of power supply 12 is chosen so that the heavy ions in the plasma will not respond to the high frequency electric field. However, RF plasma usually develops a DC bias voltage. For the present invention the self bias voltage is low enough so that ions are not accelerated to energies above the sputtering threshold of the electrode material. This is necessary to preserve lumen maintenance over lamp life. Experience has shown that a large self bias voltage is developed in discharges driven by radio frequency powers of tens of MHz and below. Thus this range of frequency is unsuitable for the present application. The preferred frequencies for the present invention include those greater than about 900 MHz.

Figure 3:
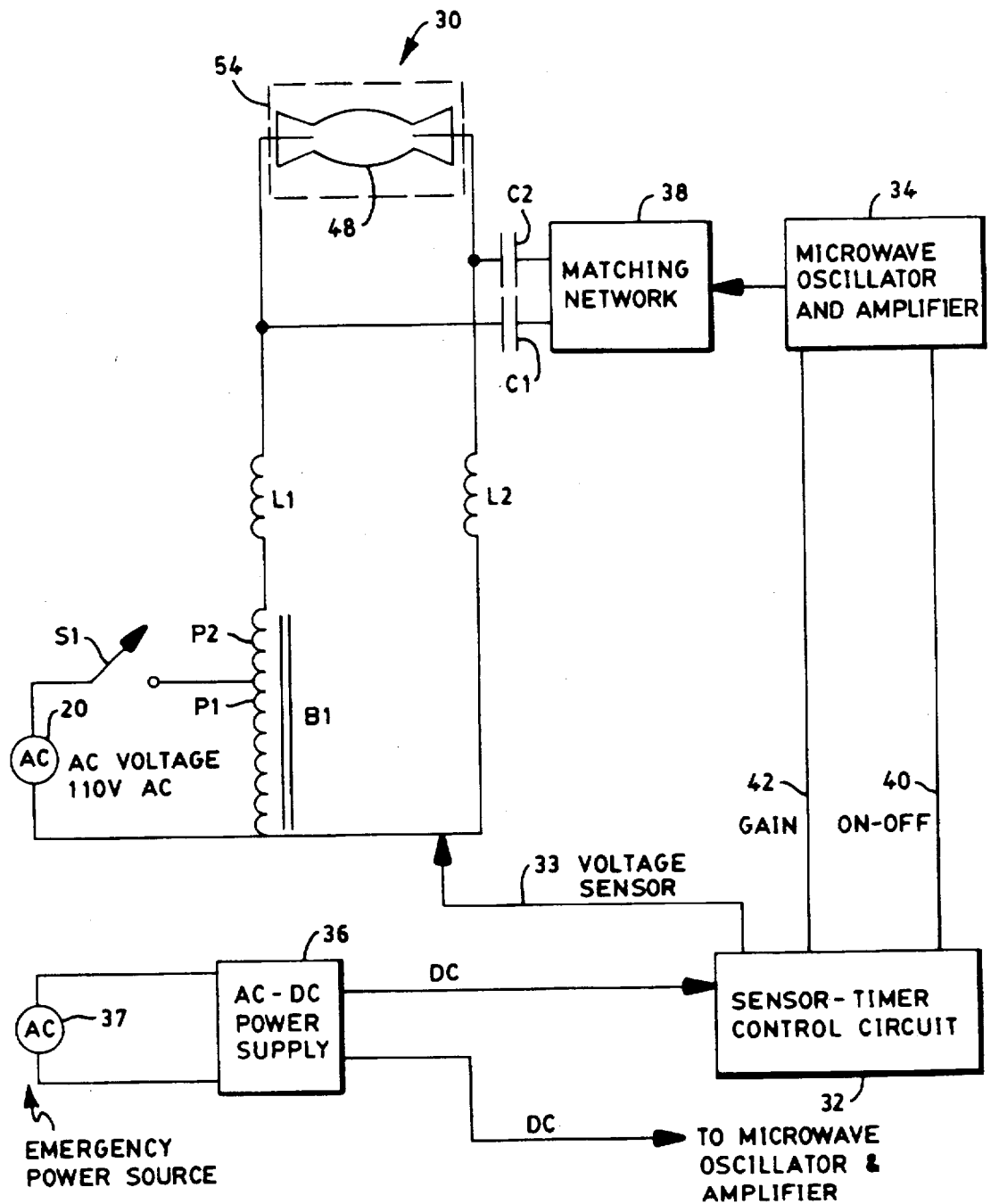
FIG. 3 is a diagram of one embodiment of a high intensity discharge circuit in accordance with the present invention.

Another embodiment of the invention is shown schematically in FIG. 3. A low frequency AC power supply 20, such as 110 volts, 60 Hz is coupled by way of a single-pole single-throw switch S1 to a ballast comprising an autotransformer B1 having a primary winding P1 and a secondary winding P2. Secondary winding P2 is coupled to one end of a high intensity discharge lamp 30. The other end of autotransformer B1 is coupled to the other end of lamp 30. The autotransformer in FIG. 3 may be replaced by a ballast inductor (not shown) if the line voltage is, for example, 220 or 277 volts.

If switch S1 is opened while the lamp is operating and connected to a conventional ballast, considerable time is required to restart the lamp. A delay of one to several minutes before the lamp will restart is common.

In accordance with the teaching of the present invention, auxiliary microwave power is provided by a microwave oscillator and amplifier 34 which has an output connected to the input of a matching network 38. Microwave power is injected into arc tube 30 via capacitors C1 and C2 which serve as microwave short circuits and decouple the microwave circuit from the primary ballast circuit.

The circuit of FIG. 3 further includes a sensor-timer control circuit 32 having a voltage sensor input 33 for measuring the voltage across the arc tube. The sensor-timer circuit can be constructed with conventional low voltage TTL logic and op-amp components. All control functions can be done at the 5 volt level typical of TTL circuits.

The voltage sensor input to the sensor control circuit 32 turns on the microwave circuit 34 when a loss of primary voltage either from opening switch S1 or loss of power from the primary AC voltage source is detected. As illustrated in FIG. 3, sensor-timer control circuit 32 has a first output lead 40 connected to microwave oscillator and amplifier 34. A signal on lead 40 provided by circuit 32 controls the operation of microwave oscillator and amplifier 34. A second output lead 42 is connected to microwave oscillator and amplifier 34 and controls the gain, and hence the output, of the microwave amplifier 34. DC voltage is supplied to sensor-timer control circuit 32 and microwave oscillator and amplifier 34 by an AC-DC power supply converter 36. Power supply converter 36 can be a conventional 5 to 15 volt DC supply of several amperes which remains on at all times. The input to power supply converter 36 may be connected to an emergency AC power source 37.

One end of an inductor L1 is connected to secondary winding P1 of autotransformer B1. The other end of inductor L1 is connected to one end of lamp 30. Similarly, one end of an inductor L2 is connected to the junction of primary winding P1 and AC supply 20. The other end of inductor L2 is connected to the other end of lamp 30. Inductors L1 and L2 prevent microwave power energy from entering the AC line.

In operation, sensor-timer control circuit 32 senses the loss of primary power to the lamp resulting from, for example, the opening of switch S1 and immediately turns on the microwave oscillator and power amplifier 34 so that microwave power can be supplied to the lamp during cooling. Circuit 32 decreases the gain of amplifier 34 and, consequently, the magnitude of the microwave power delivered to the lamp during this cool down period. Circuit 32 also interrupts microwave power to the lamp by shutting down the microwave oscillator and amplifier 34 after hot restart has occurred or after the lamp has cooled sufficiently to allow cold restart. The functions of circuit 32 can be performed using conventional low voltage, transistorized or analog integrated circuit technology.

The output power of the microwave source has to be sufficient to overcome ionization losses which are about 15% of full lamp power. This microwave power will be maximum immediately after turn off and then can be slowly reduced as the lamp cools because ionization losses slowly decrease during this time period. The output power of the microwave source can be slowly lowered as the lamp cools and the ionization loss rate decreases. This can be done on a predetermined time base and programmed into the Sensor-Time Controller circuit as the time rate of cooling would be different for different lamp wattages, construction and sizes. Eventually, after a period of a few minutes, microwave power is shut off and is not applied again until primary voltage had been sensed by the voltage sensor and had disappeared for a second time. The microwave energy supplies sufficient ionization during the hot portion of the lamps cool down period to compensate for losses that occur. Once the arc tube has sufficiently cooled, no additional microwave energy is necessary. In this manner, the arc tube instantly reignites under any temperature condition without the necessity for high voltage (15 to 50 KV) ionization forming pulses as found in other hot restart schemes. See, for instance, U.S. Pat. Nos. 4,890,041, 4,763,044 and 4,356,433

The microwave oscillator-amplifier circuit 34 may be composed of static induction transistors (SITS) since the higher power levels attainable with SITs are useful in the present application. Other solid-state devices such as bipolar junction transistors or MOSFETs can also be used in this application. Operating frequencies have to be in the ISM bands at 914 MHz and 2.54 GHz.

Figure 4:
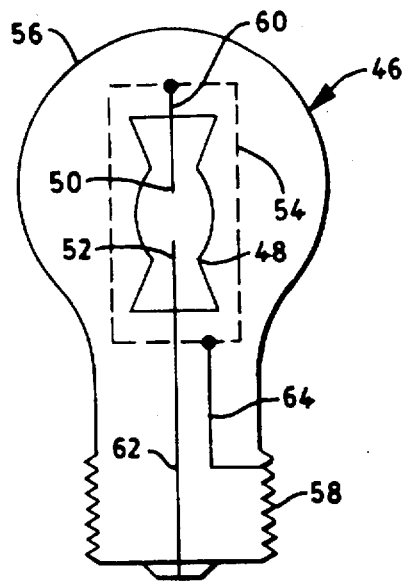
FIG. 4 is a single ended high intensity discharge lamp suitable for use with the high intensity discharge circuit of FIG. 3.

The present invention provides instant hot restart for both single ended HID lamps (having a maximum voltage rating of about 4 KV) as well as double ended HID lamps (capable of withstanding 15–50 KV pulses). A schematic diagram of a single ended HID lamp suitable for use with the present circuit is shown in FIG. 4. Lamp 46 is, for example, a low wattage metal halide lamp including an arc tube having a transparent envelope 48 of light transmitting material, such as glass or quartz and a pair of electrodes 50, 52 sealed in envelope 48. Envelope 48 houses a suitable gas such as metal halide vapor. A conductive wire mesh 54 surrounds the arc tube and allows light to easily pass. The arc tube and mesh are enclosed within an outer glass jacket 56. A suitable base 58 is disposed at one end of the outer jacket. Two lead-in wires 60, 62 are electrically connected to electrodes 50, 52, respectively. One end of lead-in wire 60 is connected to conductive wire mesh 54. Lead-in wire 62 is connected to one of the terminals of base 58. The other base terminal is connected to wire mesh 54 by an electrical lead 64.

The wire mesh 54 makes up the outer surface of a microwave resonant cavity as taught in U.S. Pat. No. 4,888, 528. It is believed that the instant invention is the only method of hot restart which can be applied to single-ended lamps. Other methods utilizing high voltage pulses to generate initial ionization would breakdown the lamp base insulator.

Figure 5:
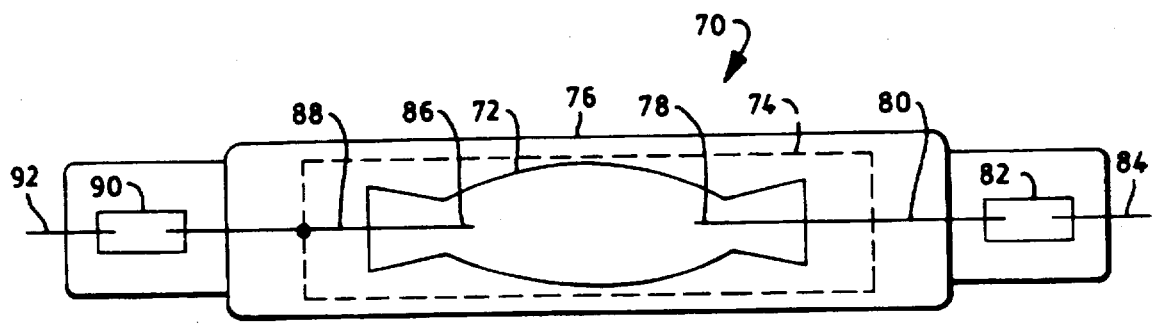
FIG. 5 is a double ended high intensity discharge lamp suitable for use with the high intensity discharge circuit of FIG. 3.

Referring next to FIG. 5, there is shown a double-ended high intensity discharge lamp 70 suitable for use with the present circuit. Lamp 70 comprises an arc tube 72 surrounded by a wire mesh 74. The arc tube and mesh are enclosed within an outer quartz jacket 76. Two lead-in wires 80, 88 are electrically connected to electrodes 78, 86, respectively. Lead-in wire 80 is connected to a molybdenum foil 82 sealed in one end of outer jacket 76. Lead-in wire 88 is electrically connected to wire mesh 74 and to a molybdenum foil 90 sealed in the other end of outer jacket 76. Two external leads 84, 92 are connected to molybdenum foils 82, 90, respectively.

There has thus been shown and described a method of hot restarting a high intensity discharge lamp. The invention eliminates the need for a high-voltage spike to generate the initial ionization and the need for an additional high voltage ballast.

While there have been shown and described what are at present considered to be the preferred embodiments of the invention, it will be apparent to those skilled in the art that various changes and alterations can be made herein without departing from the scope of the invention defined by the appended claims.

What is claimed is:

1. A method of operating a high intensity discharge lamp comprising the steps of:

providing a high intensity discharge lamp;

applying a primary source of power to said lamp to initiate and sustain an arc discharge within said lamp;

interrupting said primary source of power to said lamp to allow said lamp to cool;

applying a secondary source of power to said lamp to maintain plasma conductivity within said lamp during normal lamp operation and during a period of lamp cooling; and reapplying said primary source of power to said lamp after said period of lamp cooling to reignite and sustain an arc discharge within said lamp; and wherein the step of interrupting includes loss power from a primary AC voltage source.

2. The method of claim 1 further including the step of interrupting said secondary source of power to said lamp before reapplying said primary source of power to said lamp.

3. The method of claim 1 further including the step of decreasing the amount of power to said lamp from said secondary source of power during said period of lamp cooling.

4. The method of claim 1 wherein the power applied to said lamp from said secondary source of power is equal to about 10% to 15% of the power applied to said lamp from said primary source of power.

5. An apparatus for operating a high intensity discharge lamp comprising:

a high intensity discharge lamp;

a primary source of power coupled to said lamp for initiating and sustaining an arc discharge within said lamp;

means for interrupting said primary source of power to said lamp to allow said lamp to cool;

means for applying a secondary source of power to said lamp to maintain plasma conductivity within said lamp during normal lamp operation and during a period of lamp cooling; and means for reapplying said primary source of power to said lamp after said period of lamp cooling to reignite and sustain an arc discharge within said lamp; and wherein the means for interrupting the primary source includes loss of power from a primary AC voltage source.

6. The apparatus of claim 5 further including means for interrupting said secondary source of power to said lamp before reapplying said primary source of power to said lamp.

7. The apparatus of claim 5 further including means for decreasing the amount of power to said lamp from said secondary source of power during said period of lamp cooling.

8. The apparatus of claim 5 wherein the power applied to said lamp from said secondary source of power is equal to about 10% to 15% of the power applied to said lamp from said primary source of power.

9. An apparatus comprising:
- a high intensity discharge lamp having an envelope of light transmitting material for enclosing a metal halide vapor, said lamp having a pair of ends, a first electrode extending through one of said ends into said envelope, a second electrode extended through the other of said ends into said envelope whereby said electrodes are separated apart within said envelope and a circumferential conductive mesh surrounding said envelope, said mesh being coupled to said second electrode but physically separated from said first electrode,
- a primary source of power coupled to said lamp for operating said lamp in a normal mode;
- a microwave power oscillator and amplifier for providing a source of microwave power and having an output;
- matching network coupled to the output of said microwave power oscillator and amplifier for matching the output of said microwave power oscillator and amplifier to said lamp, said matching network having a pair of output terminals,
- a first capacitive coupling means coupling one of said output terminals of said matching network to one of said electrodes of said lamp,
- a second capacitive coupling means coupling the other of said output terminals, of said matching network to the other of said electrodes of said lamp, and
- switch means for activating said microwave power oscillator and amplifier when said primary source of power to said lamp is disconnected and wherein activation of primary power to the lamp thereafter will restart said lamp and inactivate said microwave power oscillator and amplifier and wherein the disconnection of the primary source of power includes a loss of power from a primary AC voltage source.

10. The apparatus of claim 9 wherein the power applied to said lamp from said microwave power oscillator and amplifier is equal to about 10% to 15% of the power applied to said lamp from said primary source of power.

* * * * *